(12) United States Patent
Burkhardt et al.

(10) Patent No.: US 8,463,490 B2
(45) Date of Patent: Jun. 11, 2013

(54) METHOD AND DEVICE FOR DIAGNOSING AN INTAKE TRACT OF AN INTERNAL COMBUSTION ENGINE

(75) Inventors: Thomas Burkhardt, Neutraubling (DE); Jürgen Dingl, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 380 days.

(21) Appl. No.: 12/996,868

(22) PCT Filed: May 27, 2009

(86) PCT No.: PCT/EP2009/056474
§ 371 (c)(1),
(2), (4) Date: Dec. 8, 2010

(87) PCT Pub. No.: WO2009/150057
PCT Pub. Date: Dec. 17, 2009

(65) Prior Publication Data
US 2011/0098876 A1  Apr. 28, 2011

(30) Foreign Application Priority Data
Jun. 11, 2008 (DE) .......................... 10 2008 027 762

(51) Int. Cl.
*F02D 41/22* (2006.01)
*G01M 15/05* (2006.01)

(52) U.S. Cl.
USPC ........................................ 701/34.4; 701/33.9

(58) Field of Classification Search
USPC .......................................................... 701/29
See application file for complete search history.

(56) References Cited

U.S. PATENT DOCUMENTS

| | | | | |
|---|---|---|---|---|
| 3,349,759 A | * | 10/1967 | De Castelet De Coye | ... 123/561 |
| 5,561,415 A | | 10/1996 | Dieckmann | .................... 340/444 |
| 6,062,025 A | * | 5/2000 | Okada et al. | ..................... 60/602 |
| 6,308,517 B1 | * | 10/2001 | Fausten et al. | ............... 60/605.2 |
| 6,502,543 B1 | | 1/2003 | Arai et al. | ...................... 123/348 |
| 6,543,230 B1 | * | 4/2003 | Schmid | ........................ 60/605.2 |

(Continued)

FOREIGN PATENT DOCUMENTS

| | | |
|---|---|---|
| CN | 1335912 A | 2/2002 |
| CN | 1432725 A | 7/2003 |

(Continued)

OTHER PUBLICATIONS

International Search Report and Written Opinion for Application No. PCT/EP2009/056474 (16 pages), Sep. 3, 2009.

(Continued)

*Primary Examiner* — Shelley Chen
(74) *Attorney, Agent, or Firm* — King & Spalding L.L.P.

(57) ABSTRACT

An internal combustion engine has an intake tract having a compressor. A verification is performed as to whether at least one predefined activation condition is met. A boost pressure (PUT) downstream of the compressor is sensed or determined. An adaptation characteristic curve or adaptation characteristic map (KF_AD) is adapted as a function of a rotational speed (N) of the internal combustion engine and the boost pressure (PUT) if the at least one actuation condition is met. A gradient is determined that is representative of a gradient of the adaptation characteristic curve or adaptation map (KF_AD). From the determined gradient, conclusions are drawn with respect to a fault in the intake tract of the internal combustion engine.

20 Claims, 4 Drawing Sheets

U.S. PATENT DOCUMENTS

| | | | |
|---|---|---|---|
| 6,581,382 B2 | 6/2003 | Weber et al. | 60/602 |
| 6,644,284 B2 | 11/2003 | Pfitz | 123/479 |
| 7,100,375 B2 * | 9/2006 | Baize et al. | 60/602 |
| 7,721,539 B2 * | 5/2010 | Reynolds et al. | 60/601 |
| 2002/0173898 A1 * | 11/2002 | Itoyama et al. | 701/104 |
| 2003/0075158 A1 | 4/2003 | Milos et al. | 123/568.21 |
| 2004/0231640 A1 | 11/2004 | Iwasaki et al. | 123/396 |
| 2005/0193810 A1 * | 9/2005 | Gladden | 73/119 R |
| 2006/0005540 A1 * | 1/2006 | Baize et al. | 60/600 |
| 2008/0000445 A1 * | 1/2008 | Kim et al. | 123/295 |
| 2008/0271452 A1 * | 11/2008 | Reynolds et al. | 60/611 |
| 2011/0098876 A1 | 4/2011 | Burkhardt et al. | 701/31.4 |

FOREIGN PATENT DOCUMENTS

| | | |
|---|---|---|
| DE | 4400913 | 7/1995 |
| DE | 10062350 A1 | 6/2002 |
| DE | 10065474 C1 | 6/2002 |
| DE | 102004038733 A1 | 2/2006 |
| DE | 102004036064 | 3/2006 |
| DE | 102006032836 A1 | 1/2008 |
| DE | 102008027762 B3 | 2/2010 |
| GB | 2440236 B | 5/2011 |
| JP | 2003522888 A | 7/2003 |
| WO | 2009/150057 A1 | 12/2009 |

OTHER PUBLICATIONS

Shaikh et al., Abstract of "Fault Diagnosis from Nonlinear Time Series Using Time Delay Neural Network" Proceedings of International Workshop on Soft Computing in Industry; Mororan Inst. of Technology Muroran, Japan—XP002542435 (1 page), Jun. 18, 1999.

Chinese Office Action, Chinese Application No. 200980121762.4, 17 pages, Oct. 31, 2012.

* cited by examiner

METHOD AND DEVICE FOR DIAGNOSING AN INTAKE TRACT OF AN INTERNAL COMBUSTION ENGINE

CROSS-REFERENCE TO RELATED APPLICATIONS

This application is a U.S. National Stage Application of International Application No. PCT/EP2009/056474 filed May 27, 2009, which designates the United States of America, and claims priority to German Application No. 10 2008 027 762.2 filed Jun. 11, 2008, the contents of which are hereby incorporated by reference in their entirety.

TECHNICAL FIELD

The invention relates to a method and a device for diagnosing an intake tract of an internal combustion engine. The internal combustion engine includes a compressor. The compressor is especially part of an exhaust gas turbocharger.

BACKGROUND

Component errors in the internal combustion engine can lead to an operating behavior of the internal combustion engine which deviates from that of an error-free internal combustion engine. This can lead to a worsening in emissions of the internal combustion engine and/or to components of the internal combustion engine operating outside their specified operating range. The latter can further lead to destruction of the components concerned. It is therefore prescribed or desirable for errors to be detected to enable them to be rectified as soon as possible.

SUMMARY

According to various embodiments, a method and a device for diagnosing an intake tract of an internal combustion engine can be created which respectively make it possible to detect errors in the intake tract in a simple and reliable manner. According to an embodiment, in a method for diagnosing an intake tract of an internal combustion engine, which comprises a compressor:—a check is made as to whether at least one predetermined activation condition is fulfilled,—a boost pressure is detected or determined downstream of the compressor,—an adaptation characteristic curve or an adaptation characteristic map is adapted as a function of a rotational speed of the internal combustion engine and the boost pressure if the at least one activation condition is fulfilled,—a gradient is determined which is representative of the gradient of the adaptation characteristic curve or the adaptation characteristic map, and—depending on the gradient determined, an error in the intake tract of the internal combustion engine can be detected.

According to a further embodiment, the at least one activation condition may include the boost pressure being detected or determined for a predetermined operating state of the internal combustion engine, in which, for an error-free internal combustion engine, the detected or determined boost pressure corresponds to a basic boost pressure. According to a further embodiment, the predetermined operating state in which, for an error-free internal combustion engine, the detected or determined boost pressure corresponds to the basic boost pressure may include a throttle valve being controlled so that the throttle valve has at least one predetermined maximum degree of opening, and a waste gate of an exhaust gas turbocharger is controlled such that a power of the exhaust gas turbocharger corresponds to a pre-determined minimum power. According to a further embodiment, the at least one activation condition may include the predetermined operating state obtaining for a predetermined minimum duration. According to a further embodiment, before a predetermined number of operating hours is reached or a predetermined number of adaptation steps after the internal combustion engine is first put into service, instead of the adaptation characteristic curve or the adaptation characteristic map a further adaptation characteristic curve or a further adaptation characteristic map can be adapted if the at least one activation condition is fulfilled, and after the predetermined number of operating hours or number of adaptation steps has been reached, the adaptation characteristic curve or the adaptation characteristic map is adapted as a function of the further adaptation characteristic curve or the further adaptation characteristic map. According to a further embodiment, the adaptation characteristic curve or the adaptation characteristic map or if necessary the further adaptation characteristic curve for the further adaptation characteristic map can be adapted if the boost pressure detected or determined for the rotational speed is greater by a predetermined upper adaptation threshold value than an adapted basic boost pressure value assigned to the rotational speed, which depends on the adaptation characteristic curve or the adaptation characteristic map and if necessary on the further adaptation characteristic curve for the further adaptation characteristic map, or is less by a predetermined lower adaptation threshold value than the adapted basic boost pressure value assigned to the rotational speed. According to a further embodiment, the adaptation characteristic curve or the adaptation characteristic map can be adapted as a function of the ambient pressure if the at least one activation condition is fulfilled. According to a further embodiment, the gradient can be determined as a gradient of a regression line and the regression line is determined as a function of the basic boost pressure adaptation pressure values stored in the adaptation characteristic curve or the adaptation characteristic map plotted against the rotational speed. According to a further embodiment, a leakage downstream of the compressor can be detected as the error of the intake tract if the gradient is greater than a predetermined positive gradient threshold value. According to a further embodiment, a contaminated air filter can be detected as the error of the intake tract if the gradient is less than a predetermined negative gradient threshold value.

According to another embodiments, a device for diagnosing an intake tract of an internal combustion engine, wherein the internal combustion engine comprising a compressor being embodied—to check whether at least one predetermined activation condition is fulfilled,—to detect or determine a boost pressure downstream of the compressor,—to adapt an adaptation characteristic curve or an adaptation characteristic map as a function of a rotational speed of the internal combustion engine and the boost pressure if the at least one activation condition is fulfilled,—to determine a gradient which is representative for a gradient of the adaptation characteristic curve or the adaptation characteristic map, and—to detect an error of the intake tract of the internal combustion engine as a function of the gradient determined.

BRIEF DESCRIPTION OF THE DRAWINGS

Exemplary embodiments are explained below on the basis of the schematic diagrams. The drawings show.

Elements which are constructed or which function in the same way are labeled with the same reference signs in all figures.

DETAILED DESCRIPTION

According to an embodiment, in a method and a corresponding device for diagnosing an intake tract of an internal combustion engine, wherein the internal combustion engine includes a compressor, a check is made as to whether at least one predetermined activation condition is fulfilled. A boost pressure downstream of the compressor is sensed or determined. An adaptation characteristic curve or an adaptation characteristic map is adapted as a function of a rotational speed of the internal combustion engine and the boost pressure if the at least one activation condition is fulfilled. A gradient is determined that is representative of the gradient of the adaptation characteristic curve or of the adaptation characteristic map. Depending on the gradient determined, conclusions are drawn with respect to an error in the intake tract of the internal combustion engine.

According to various embodiments, errors in the intake tract of the internal combustion engine are reflected in the adaptation characteristic curve or the adaptation characteristic map and especially in the gradient of the adaptation characteristic curve or the adaptation characteristic map because of a characteristic dependence of the boost pressure on the rotational speed of the internal combustion engine in the event of an error. In particular a leakage downstream of the compressor or a contaminated air filter are able to be simply and reliably detected and distinguished from one another as a function of the determined gradient as errors of the intake tract.

In an embodiment the at least one activation condition consists of the boost pressure being detected or determined for a predetermined operating state of the internal combustion engine in which, for an error-free internal combustion engine, the sensed or determined boost pressure corresponds to a basic boost pressure. In particular a setpoint boost pressure corresponds to the basic boost pressure in the predetermined operating state. The predetermined operating state can especially be assumed for different rotational speeds of the internal combustion engine. In the adaptation characteristic curve or the adaptation characteristic map especially rotational speed-dependent changes in the basic boost pressure, such as can typically be caused by wear and ageing, are adapted and thereby learned. When the predetermined operating state prevails influencing variables which can affect the boost pressure are largely eliminated. The advantage is that the boost pressure is then essentially only dependent on the rotational speed of the internal combustion engine and on an ambient pressure. The boost pressure is able to be determined especially reliably and precisely by this method and accordingly the basic boost pressure is able to be adapted especially reliably and precisely, meaning that it can be learned. It is thus possible to detect the error in the intake tract in a simple and reliable manner.

In this context it is advantageous for the predetermined operating state in which the sensed or determined boost pressure corresponds to the basic boost pressure for an error-free internal combustion engine, for the throttle valve to be controlled so that the throttle valve has at least a predetermined maximum degree of opening and for a turbine waste gate of an exhaust gas turbocharger to be controlled so that a power of the turbocharger corresponds to a predetermined minimum power. In the predetermined operating state the throttle valve is especially, as far as possible, completely dethrottled and the power of the exhaust gas turbocharger especially, where possible, has a minimum value. The predetermined maximum degree of opening of the throttle valve is especially predetermined as a function of the respective operating state of the internal combustion engine and is especially predetermined as a function of an air mass flow through the throttle valve and/or the rotational speed of the internal combustion engine. The predetermined maximum degree of opening of the throttle valve is predetermined especially such that a drop in pressure across the throttle valve is minimal, meaning that the drop in pressure across the throttle valve is not able to be significantly reduced any more by any possible further opening of the throttle flap. For example the throttle valve must if necessary be opened less far for a small air mass flow through this valve than for a large air mass flow. Accordingly the turbine waste gate is activated in such a way that the power of the exhaust gas turbocharger and especially of the compressor can no longer be reduced or at least no longer significantly reduced. To this end the turbine waste gate is typically activated such that the exhaust gas is conveyed completely or almost completely past a turbine of the exhaust gas turbocharger so that the turbine is not driven by the exhaust gas or is only driven to a negligible extent. Such a throttle valve setting and turbine waste gate setting mean that these settings are largely removed as influencing variables on the boost pressure. This makes the detection of the error in the intake tract simple and precise.

In a further embodiment the at least one activation condition consists of a prevailing predetermined operating state existing for a predetermined minimum duration. This enables it to be ensured very simply that the sensed or determined boost pressure corresponds to the basic boost pressure, i.e. this counteracts falsifications resulting from dynamic changes in the boost pressure. This means that a simple and precise adaptation and thereby learning of the basic boost pressure is possible.

In an embodiment, before a predetermined number of operating hours or predetermined number of adaptation steps is reached after the internal combustion engine is first put into service, instead of the adaptation characteristic curve or the adaptation characteristic map, a further adaptation characteristic curve or a further adaptation characteristic map is adapted if at least one activation condition is fulfilled. After the predetermined number of operating hours or number of adaptation steps is reached, the adaptation characteristic curve or the adaptation characteristic map is adapted as a function of the further adaptation characteristic curve or the further adaptation characteristic map. Individual characteristics of the internal combustion engine in relation to the basic boost pressure, for example as a result of scattering of a turbine efficiency of the exhaust gas turbocharger, scattering of actuators of the turbine of the exhaust gas turbocharger for example in relation to a hardness and/or pre tensioning of the spring which acts on the waste gate of the exhaust gas turbocharger for adjusting the power of the turbocharger, or scattering of displacement lines of the internal combustion engine can thus be separately learned and distinguished from subsequent changes caused for example by wear or ageing. The adaptation characteristic curve or the adaptation characteristic map thus preferably represent essentially only changes of the basic boost pressure which have arisen after the predetermined number of operating hours or number of adaptation steps have been reached and is thus essentially not influenced by the individual characteristics of the internal combustion engine. This makes it possible to detect faults in an especially simple, precise and reliable manner. Preferably each fulfillment of the at least one activation condition, if a speed of the internal combustion engine is present for which there is provision for the adaptation of the basic charge pressure, is counted as an adaptation step. An adaptation step can however also be predetermined in another way.

In an embodiment the adaptation characteristic curve or the adaptation characteristic map or where necessary the further adaptation characteristic curve or the further adaptation characteristic map are adapted if the boost pressure sensed or determined for the rotational speed is greater by a predetermined upper adaptation threshold value than an adapted basic pressure value assigned to the rotational speed or is less by a predetermined lower adaptation threshold value than the adapted basic boost pressure value assigned to the rotational speed. The adapted basic boost pressure value is dependent on the adaptation characteristic curve or the adaptation characteristic map and if necessary on the further adaptation characteristic curve or the further adaptation characteristic map. The advantage is that high reliability is possible in this way. Only relevant changes in the basic boost pressure will be adapted.

In a further embodiment the adaptation characteristic curve or the adaptation characteristic map is adapted as a function of the ambient pressure if the at least one activation condition is fulfilled. This allows an especially high accuracy of adaptation and thereby an especially reliable detection of errors in the intake tract.

In a further embodiment the gradient is determined as the gradient of a regression line. The regression line is determined as a function of basic boost pressure adaptation pressure values stored in the adaptation characteristic curve or the adaptation characteristic map plotted against the rotational speed. The advantage is that this is possible in a simple and reliable manner.

In a further embodiment a leakage downstream of the compressor is detected as the error of the intake tract if the gradient is greater than a predetermined positive gradient threshold value. In particular the basic boost pressure adaptation pressure values simultaneously have a negative leading sign in the adaptation characteristic curve or the adaptation characteristic map. The leakage downstream from the compressor can thus be detected very simply and reliably.

In a further embodiment a contaminated air filter is recognized as the error of the intake tract if the gradient is less than a predetermined negative gradient threshold value. In particular the basic boost pressure adaptation pressure values in the adaptation characteristic curve or the adaptation characteristic map simultaneously have a negative leading sign. The contaminated air filter can thus be detected very simply and reliably.

Figure 1:
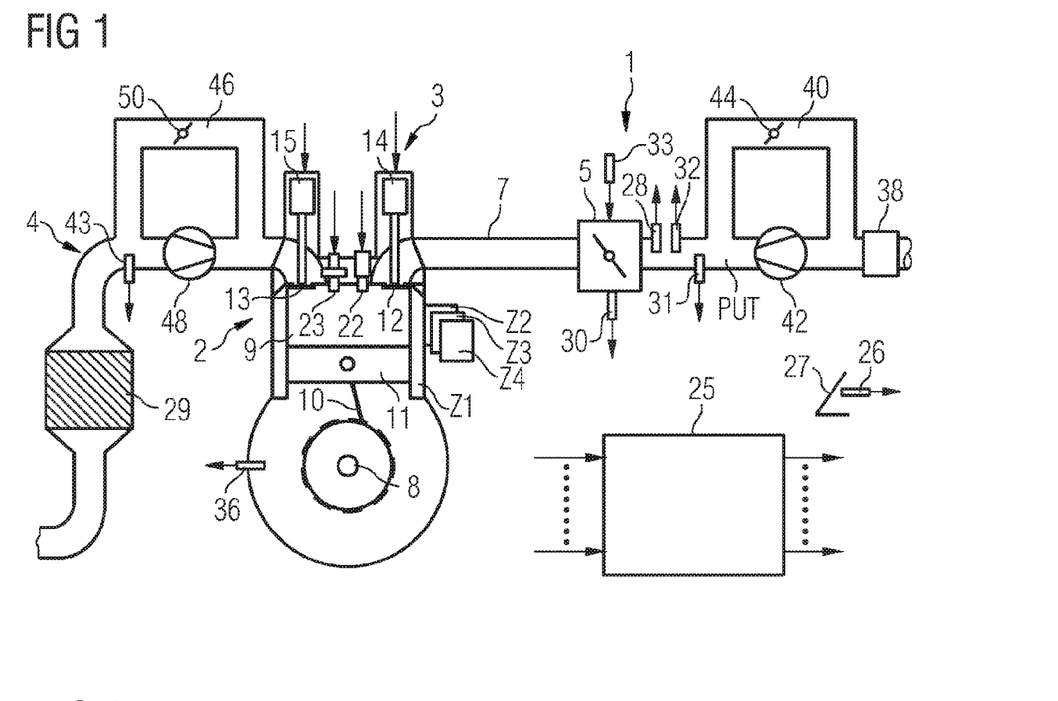
FIG. 1 an internal combustion engine with an intake tract.

An internal combustion engine comprises an intake tract 2, an engine block 3, a cylinder head 4 and an exhaust tract (FIG. 1). The internal combustion engine is preferably embodied for a motor vehicle and is preferably arranged in a motor vehicle. The intake tract includes a throttle valve 5 and an induction manifold 7 which is routed through to a combustion chamber 9 of a first cylinder Z1 via an inlet duct in the engine block 2. The engine block 2 also includes a crankshaft 8 which is coupled via a connecting rod to a piston 11 of the first cylinder Z1. An exhaust gas catalytic converter 29, which is typically embodied as a three-way catalytic converter, is preferably arranged in the exhaust tract 4. In addition to the first cylinder Z1, one or more further cylinders can be provided, for example a second cylinder Z2, a third cylinder Z3 and a fourth cylinder Z4. In addition any given number of cylinders can be provided.

The cylinder head 3 includes a valve mechanism with gas exchange valves, which are gas inlet valves 12 and gas exhaust valves 13 and the valve drives 14, 15 assigned thereto. The cylinder head 3 further includes an injection valve 22 and a spark plug 23. If the internal combustion engine is a diesel engine the internal combustion engine can also not include any spark plugs 23. As an alternative the injection valve 22 can also be arranged in the induction manifold 7.

A control device 25 is provided to which sensors are assigned which detect different measured variables and each determine the value of the measured variable. Operating variables include the measured variables and variables derived from the measured variables. The control device 25 determines control variables as a function of at least one of the measured variables, which are then converted into one or more control signals for controlling the positioning elements by means of corresponding positioning drives. The control device 25 can also be referred to as a facility for operating the internal combustion engine and/or as a facility for diagnosis of the intake tract 1 of the internal combustion engine. An operating state of the internal combustion engine can be predetermined as a function of the control signals.

The sensors are a pedal position sensor 26 which detects a pedal position of the gas pedal 27, and air mass sensor 28 which detects an air mass flow upstream of the throttle valve 5, a throttle valve position sensor 30 which detects a degree of opening of the throttle valve 5, a boost pressure sensor 31 which detects a boost pressure PUT upstream of the throttle valve 5 and downstream of a compressor 42, a temperature sensor 32 which detects and induction air temperature, a crankshaft sensor 36 which detects a crankshaft angle to which a rotational speed N of the internal combustion engine is then assigned. In addition a Lambda probe 43 can be provided of which the measurement signal is representative for an air/fuel ratio of an exhaust gas of the internal combustion engine. Depending on the form of embodiment any given subset of the said sensors can be present or additional sensors can also be present.

The positioning elements of example a throttle valve positioning element 33 to adjust the throttle valve 5, the gas inlet and gas outlet valves 12, 13, the injection valve 22 the spark plug 23, a positioning element to adjust a compressor bypass valve 44 and/or a valve positioning element for adjusting a waste gate 50.

The compressor 42 is arranged in the intake tract 1 downstream of the throttle valve 5 and upstream of an air filter 38. Depending on a predetermined control of the positioning element for adjusting the compressor bypass valve 44, fresh air, after flowing through the compressor 42, can be conveyed back around the compressor 42 via a compressor bypass line 40 so that the fresh air conveyed through the compressor 42 will not be compressed in volume after the compressor 42. An exhaust gas turbocharger includes the compressor 42 and a turbine 48 which is coupled to the compressor 42 for driving the compressor 42 and which is arranged in the exhaust tract 4 so that it can be driven by the exhaust gas from the combustion process in the combustion chamber 9. The exhaust gas can be conveyed via a waste gate line 46 to the turbine 48 so that the exhaust gas conveyed through the waste gate line 46 does not drive the turbine 48. The exhaust gas is conveyed past the turbine 48 depending on a predetermined activation of the valve positioning element.

The waste gate 50 can also be referred to as the waste gate. The waste gate 50 is coupled to the valve positioning element for adjusting the waste gate 50. The valve positioning element preferably includes a pressure cell, a pressure cell valve and a pressure cell transmission. The pressure cell comprises an ambient pressure volume and an inlet pressure volume. The ambient pressure volume and the inlet pressure volume are separated from each other by a membrane. The membrane is preferably coupled to a pressure cell spring and to the pressure cell transmission. Depending on a switching position of the pressure cell valve, either the boost pressure PUT of the compressor 42 or an ambient pressure AMP of the air around the internal combustion engine can be applied to the inlet pressure volume. The ambient pressure AMP is also applied to the ambient pressure volume of the pressure cell.

Depending on an operating point of the internal combustion engine, a first opening force can be exerted on the waste gate 50 by the exhaust gas of the internal combustion engine. In this context the term opening means that the force is exerted on the waste gate 50 in the opening direction of the waste gate 50.

The pressure cell spring is preferably arranged so that, through its spring force, it keeps the inlet pressure volume as low as possible and so that it applies through its pressure cell transmission a closing second force to the waste gate 50 in the closing direction of the waste gate 50.

If the pressure cell valve in its basic setting in which the inlet pressure volume has the ambient pressure AMP applied to it and which is representative for a basic position of the valve position element, the ambient pressure AMP obtains in the inlet pressure volume and the ambient pressure volume. Thus as a result of the pressure in the pressure cell no force is exerted on the membrane.

If the pressure cell valve is in a predetermined switch setting in which the inlet pressure volume has the boost pressure PUT applied to it and which is representative of the predetermined activation of the valve positioning element, the boost pressure PUT is applied to the inlet pressure volume. Since the boost pressure PUT is greater than the ambient pressure AMP in the fault-free operating mode of the internal combustion engine, a difference in pressure forms in the pressure cell between the ambient pressure AMP and the boost pressure PUT. This difference in pressure gives rise to an opening third force on the membrane so that the inlet pressure volume increases, the pressure cell spring is compressed and the pressure cell transmission has a force applied to it such that the pressure cell transmission applies a third force to the waste gate acting in an opening direction of the waste gate 50.

In the basic position the pressure cell valve is positioned so that the inlet pressure volume has the ambient pressure AMP applied to it. Thus only the opening first and the closing second force act on the waste gate 50 in the basic position. Thus with a suitably large spring stiffness, to be selected according to the design in the basic position of the pressure cell valve, the waste gate 50 is closed. The closed waste gate 50 leads to substantially the entire exhaust gas being conveyed through the turbine 48 and driving the turbine 48. The turbine 48 drives the compressor 42, which with a closed compressor bypass valve 44 builds up the boost pressure PUT downstream of the compressor 42. A power of the exhaust gas turbocharger and especially of the compressor 42 is then at its maximum for the respective operating state and especially for the rotational speed N of the internal combustion engine currently obtaining. The boost pressure PUT generated in this way can for example contribute to increasing an output and/or and efficiency of the internal combustion engine.

If the pressure cell valve is in the predetermined switch position in which the inlet pressure volume has the boost pressure PUT applied to it, the waste gate 50 opens as soon as the balance of forces made up of the three forces acting on the waste gate 50 is shifted in favor of the opening third force. In other words the waste gate 50 opens as soon as the opening third force, because of the difference in pressure acting on the membrane, is greater than the force of the pressure cell spring which acts on the membrane, reduced by the force which the exhaust gas exerts on the waste gate 50. As soon as the waste gate 50 moves out of its closed position, exhaust gas is conveyed past the turbine 48 via the turbine bypass line 46. This causes a reduction in the rotational speed of the turbine 48 and thereby a reduction in the rotational speed of the compressor 42. This means that the boost pressure PUT also falls. This leads to a reduction in the pressure difference and after a short period of time, during which the inlet pressure volume has the boost pressure PUT applied to it, leads to the waste gate 50 being closed. This leads the pressure difference building again.

While the internal combustion engine is operating in error-free mode a dynamic equilibrium is thus established between the three forces which act on the waste gate 50, if the valve positioning element, especially the pressure cell valve, is located in a predetermined switch position. Likewise, for a predetermined degree of opening of the waste gate 50, a dynamic equilibrium is established. The dynamic equilibrium in this context means that the pressure difference and the degree of opening of the waste gate 50, although they do not absolutely have to have the same amount, can however fluctuate by a small amount around a fixed constant value.

Because of these dynamic equilibriums, especially as a result of the spring force of the pressure cell spring and the force of the exhaust gas back pressure, the compressor 42 basically builds up the boost pressure PUT independently of the switch position of the pressure cell valve. If the waste gate 50 is activated such that the exhaust gas is conveyed completely or almost completely via the turbine bypass line 46 past the turbine 48, then the output of the exhaust gas turbocharger and especially of the compressor is however minimal for the respective operating state and especially for the relevant rotational speed N of the internal combustion engine which obtains.

For operation of the internal combustion engine in which the throttle valve positioning element 33 is preferably controlled so that a throttling of the fresh air sucked in via the throttle valve 5 is minimal, a volume flow of the air sucked in by the combustion chamber 9 corresponds to a volume flow through the compressor 42. The volume flow through the compressor 42 thus depends on the rotational speed N of the internal combustion engine.

A basic boost pressure PUT_WG_OPEN is the boost pressure PUT which the compressor builds up in dethrottled operation and with the predetermined control of the valve positioning element of the waste gate 50, meaning for an essentially minimum output of the exhaust gas turbocharger. Thus the basic boost pressure PUT_WG_OPEN also depends on the rotational speed N of the internal combustion engine and on the volume flow through the compressor 42. A throttle valve position POS_THR of the throttle valve 5 as well as a waste gate position POS_WG of the waste gate 50 then no longer significantly influence the boost pressure PUT, meaning that the boost pressure PUT is substantially independent of the throttle valve position POS_THR and the waste gate position POS_WG if the throttle valve 5 is controlled such that this is essentially completely dethrottled, meaning that a fall in pressure across the throttle valve 5 is essentially minimal and the waste gate 50 is controlled such that essentially the entire exhaust gas is conveyed past the turbine 48, the output of the exhaust gas turbocharger is thus essentially minimal. Such an operating state of the internal combustion engine is referred to below as the predetermined operating state. If the internal combustion engine is error free and especially for an error-free intake tract 1 of the internal combustion engine, the boost pressure PUT obtaining downstream of the compressor 42 then corresponds to the basic boost pressure PUT_WG_OPEN. Preferably the basic boost pressure PUT_WG_OPEN will be normalized depending on the ambient pressure AMP.

For a diagnosis of the internal combustion engine and especially of the intake tract 1 of the internal combustion engine, in general measured values of sensors of the internal combustion engine and an activation of actuators of the internal combustion engine are checked against each other for plausibility. Component errors of the internal combustion engine, for example sensor faults, throttle faults or leakages, allow the measured values if necessary to clearly deviate from the model values determined and/or stored for an error-free reference internal combustion engine in the control device. The model values are based on a sealed intake tract 1, meaning that except for the connections to the environment provided by the construction, for example at the air filter 38, at the gas inlet valve 12 into the respective cylinder or connection hoses to a crankshaft housing or fuel tank for example, there are no undesired openings present, for example non-tight pipe connections, porous hoses, gaps opening up under the influence of the operation of the internal combustion engine or the like. An occurrence of such sealing problems may cause a modeled value to deviate from the actual behavior of the internal combustion engine. This can lead to a deterioration in emissions of the internal combustion engine and/or to components of the internal combustion engine operating outside their specified operating range. The latter can also lead to the components involved being destroyed.

An intake tract 1 leakage downstream of the compressor 42 can lead to too low an estimation of a rotational speed of the turbocharger, meaning especially a rotational speed of the turbine 48 and thus also of the compressor 42. If the exhaust gas turbocharger is to be operated in a region of its maximum permissible rotational speed, then the actual rotational speed of the exhaust gas turbocharger can be above the maximum permissible rotational speed and can reduce the lifetime of the exhaust gas turbocharger or can destroy the latter. The corresponding also applies if the air filter 38 is contaminated. A contamination of the air filter 38 leads to a fall in an actual pressure downstream of the air filter 38 below a value modeled for the reference internal combustion engine. A fall in pressure at the air filter 38 is dependent on an air mass flow through the air filter 38. To enable a predetermined pressure downstream of the compressor 42, meaning especially the boost pressure PUT, to be reached, the exhaust gas turbocharger must be operated at a higher speed than with an error-free internal combustion engine, meaning with a clean air filter 38. If the exhaust gas turbocharger is to be operated in the region of its maximum permissible rotational speed, the actual rotational speed of the exhaust gas turbocharger can likewise be above the maximum permissible rotational speed and can reduce the lifetime of the exhaust gas turbocharger or destroy the latter.

Figure 2:
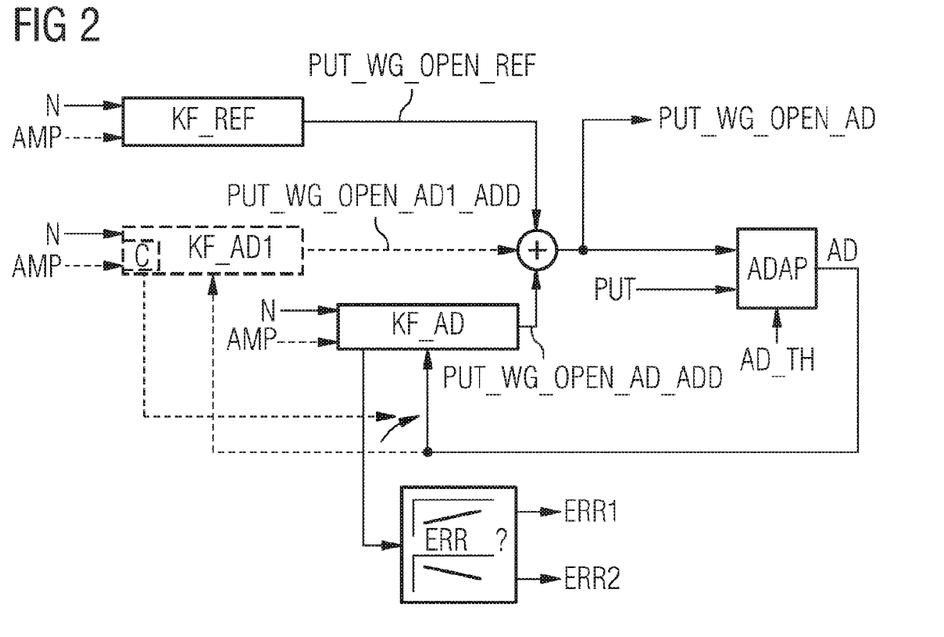
FIG. 2 a block diagram.

FIG. 2 shows a block diagram. An adaptation characteristic map KF_AD, an adaptation device ADAP and an error detection device ERR are provided in the control device 25. Preferably a reference characteristic map KF_REF and if necessary a further adaptation characteristic map KF_AD1 are also provided. The adaptation characteristic map KF_AD, the further adaptation characteristic map KF_AD1 and/or the reference characteristic map KF_REF can alternately also be embodied as an adaptation characteristic curve, further adaptation characteristic curve or reference characteristic curve respectively.

Depending on the rotational speed N of the internal combustion engine and preferably depending on the ambient pressure AMP, a basic boost pressure adaptation pressure value PUT_WG_OPEN_AD_ADD is able to be determined by means of the adaptation characteristic map KF_AD, i.e. the basic boost pressure adaptation pressure value PUT_WG_OPEN_AD_ADD is stored in the adaptation characteristic map KF_AD as a function of the rotational speed N of the internal combustion engine and if necessary as a function of the ambient pressure AMP: PUT_WG_OPEN_AD_ADD=f (N) or PUT_WG_OPEN_AD_ADD=f(N, AMP). A reference basic boost pressure value PUT_WG_OPEN_REF is also able to be determined as a function of the rotational speed N of the internal combustion engine and preferably as a function of the ambient pressure AMP by means of the reference characteristic map KF_REF, i.e. the reference basic boost pressure value PUT_WG_OPEN_REF is stored in the reference characteristic map KF_REF as a function of the rotational speed N of the internal combustion engine and if necessary as a function of the ambient pressure AMP: PUT_WG_OPEN_REF=f (N) or PUT_WG_OPEN_REF=f (N, AMP). Accordingly, depending on the rotational speed N of the internal combustion engine and preferably depending on the ambient pressure AMP, a further basic boost pressure adaptation pressure value PUT_WG_OPEN_AD1_ADD is able to be determined by means of the further adaptation characteristic map KF_AD1, i.e. the further basic boost pressure adaptation pressure value PUT_WG_OPEN_AD1_ADD is stored in the further adaptation characteristic map KF_AD1 as a function of the rotational speed N of the internal combustion engine and if necessary as a function of the ambient pressure AMP: PUT_WG_OPEN_AD1_ADD=f(N) or PUT_WG_OPEN_AD1_ADD=f (N, AMP).

Preferably reference basic boost pressure values PUT_WG_OPEN_REF of the reference internal combustion engine are stored in the reference characteristic map KF_REF which have typically been determined on an engine test bench for the respective type of internal combustion engine and which are stored, preferably as constants, i.e. unchangeably, in the reference characteristic map KF_REF. The reference basic boost pressure values PUT_WG_OPEN_REF determined in this way allow operation of the internal combustion engine from the time that the internal combustion engine is first put into service. However generally operating variables of single individuals of the respective type of internal combustion engine are scattered by comparison with the reference internal combustion engine. For example an efficiency of the exhaust gas turbocharger can be scattered or engine displacement lines can be scattered or characteristics of actuators of the turbine 48 can be scattered, for example a hardiness of the pressure cell spring or a pre-tensioning of the pressure cell spring. These types of deviation in relation to the reference internal combustion engine can influence a level of the basic boost pressure PUT_WG_OPEN, so that the basic boost pressure PUT_WG_OPEN is generally likewise scattered individually, i.e. deviates from the basic boost pressure PUT_WG_OPEN of the reference internal combustion engine obtaining in the respective operating state, i.e. deviates from the respective reference basic boost pressure value PUT_WG_OPEN_REF. Preferably the further adaptation characteristic map KF_AD1 is thus provided for storing the relative deviations of the basic boost pressure PUT_WG_OPEN actually obtaining in the predetermined operating state of the internal combustion engine from the respective associated reference basic boost pressure value PUT_WG_OPEN_REF which is stored in the reference characteristic map KF_REF. These relative deviations relate to the individual differences between the internal combustion engine assumed to be error-free in relation to the error-free reference internal combustion engine. Preferably these relative deviations are learned by adapting the further adaptation characteristic map KF_AD1 in the presence of at least one activation condition and especially in the presence of the predetermined operating state of the internal combustion engine prior to reaching a predetermined number of operating hours or a predetermined number of adaptation steps after and especially directly after the first time that the internal combustion engine is put into service. When the internal combustion engine is first put into service the further adaptation characteristic map KF_AD1 is preferably initialized with zero for each rotational speed N of the internal combustion engine provided in the further adaptation field KF_AD1. The predetermined number of operating hours or the predetermined number of adaptation steps respectively are preferably predetermined so that the relative deviations in relation to the basic boost pressure PUT_WG_OPEN are able to be learned as completely as possible because of the individual differences between the internal combustion engine and the reference internal combustion engine, i.e. where possible for each rotational speed N of the internal combustion engine stored in the further adaptation characteristic map KF_AD1 during normal operation of the internal combustion engine. A sum of the reference basic boost pressure value PUT_WG_OPEN_REF stored for a predetermined rotational speed N and of the further basic boost pressure adaptation pressure value PUT_WG_OPEN_AD1_ADD learned for the predetermined rotational speed N then preferably corresponds, on reaching the predetermined number of operating hours or the predetermined number of adaptation steps respectively, exactly to the actual basic boost pressure PUT_WG_OPEN obtaining for the predetermined rotational speed N. On reaching the predetermined number of operating hours or the predetermined number of adaptation steps respectively the further adaptation characteristic curve KF_AD1 is no longer further adapted and is thereafter treated as constant and unchangeable in accordance with the reference characteristic map KF_REF. The predetermined number of operating hours typically amounts to something in the order of magnitude of 100 hours and the predetermined number of adaptation steps typically amounts to around 20 adaptation steps for each rotational speed N provided in the further adaptation characteristic map KF_AD1. The predetermined number of operating hours or the predetermined number of adaptation steps respectively can however also be predetermined in another way. Preferably a counter C is provided for counting the operating hours or adaptation steps respectively and for comparing these with the predetermined number of operating hours or number of adaptation steps respectively.

The adaptation characteristic map KF_AD is provided for storing the relative deviations of the basic boost pressure PUT_WG_OPEN actually obtaining in the predetermined operating state of the internal combustion engine from the sum of the respective associated reference basic boost pressure value PUT_WG_OPEN_REF and the respective associated further basic boost pressure adaptation value PUT_WG_OPEN_AD1_ADD after reaching the predetermined number of operating hours or after reaching the predetermined number of adaptation steps respectively. This means that essentially those changes to the basic boost pressure PUT_WG_OPEN are stored in the adaptation characteristic map KF_AD which are based on an ageing or wear in the internal combustion engine and its components. Furthermore changes as a result of errors of the intake tract 1, for example leakages or the contamination of the air filter 38, are learned in the adaptation characteristic map KF_AD by adaptation. When the internal combustion engine is first put into service the adaptation characteristic map KF_AD is preferably initialized with zero for each rotational speed N provided in the adaptation characteristic map KF_AD. Depending on the basic boost pressure value PUT_WG_OPEN_REF, the basic boost pressure adaption pressure value PUT_WG_OPEN_AD_ADD and the further basic boost pressure adaption pressure value PUT_WG_OPEN_AD1_ADD, an adapted basic boost pressure value PUT_WG_OPEN_AD is determined which, after the predetermined number of operating hours or the predetermined number of adaptation steps respectively has been reached, preferably corresponds very precisely to the actual basic boost pressure PUT_WG_OPEN obtaining for the respective rotational speed N obtaining. The adapted basic boost pressure value PUT_WG_OPEN_AD is preferably determined as the sum of the reference basic boost pressure value PUT_WG_OPEN_REF, the basic boost pressure adaptation pressure value PUT_WG_OPEN_AD_ADD and the further basic boost pressure adaptation pressure value PUT_WG_OPEN_AD1_ADD and is fed to the adaptation device ADAP on its input side. Also fed to the adaptation device ADAP on its input side is the boost pressure PUT detected by means of the boost pressure sensor 31. The boost pressure PUT can if necessary also be determined as a function of a respective measured value of another sensor or other sensors, for example as a function of a respective measured value of an induction manifold pressure sensor in the induction manifold 7 not shown in the diagram. If the throttle valve 5 is essentially at its maximum opening, an induction manifold pressure in the induction manifold 7 downstream from the throttle valve 5 is substantially equal in size to the boost pressure PUT upstream of the throttle valve 5.

Figure 3:
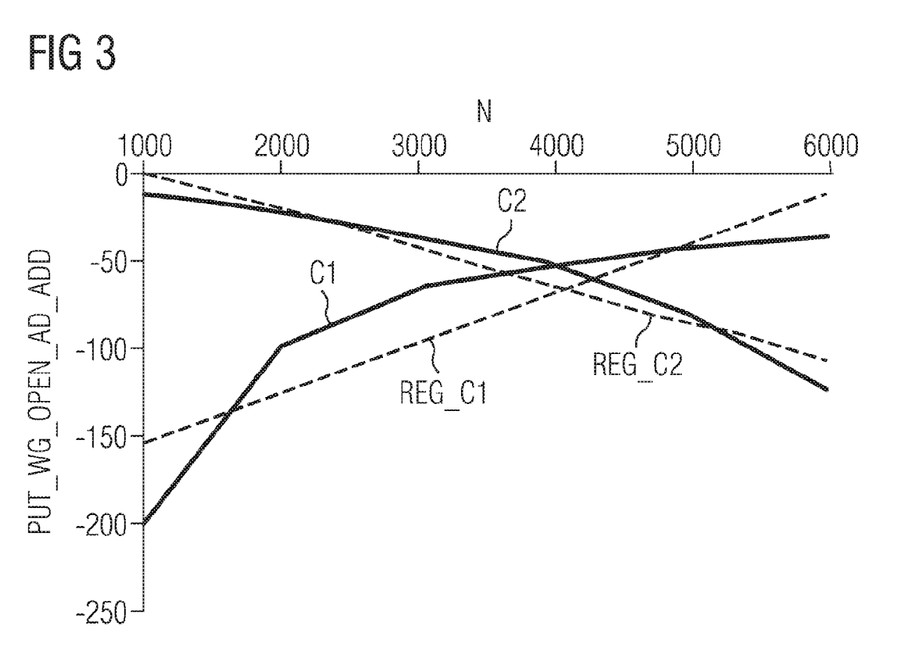
FIG. 3 a diagram with typical curves of a basic boost pressure adaptation pressure value plotted against a rotational speed of the internal combustion engine, FIG. 4A a first part of a flow diagram of a program for diagnosing the intake tract of the internal combustion engine and FIG. 4B a second part of the flow diagram of the program for diagnosing the intake tract of the internal combustion engine.
Figure 4A:
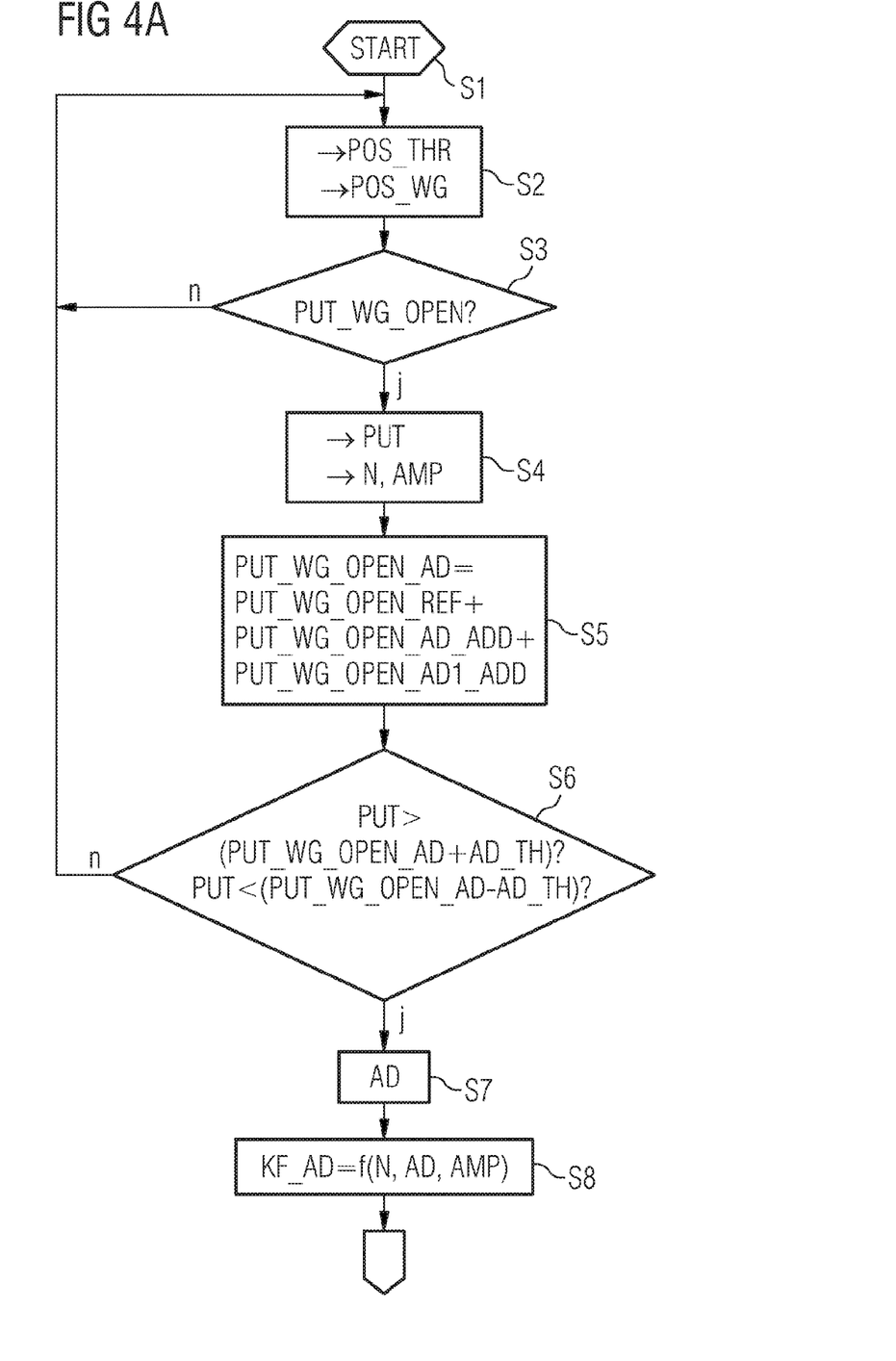
Figure 4B:
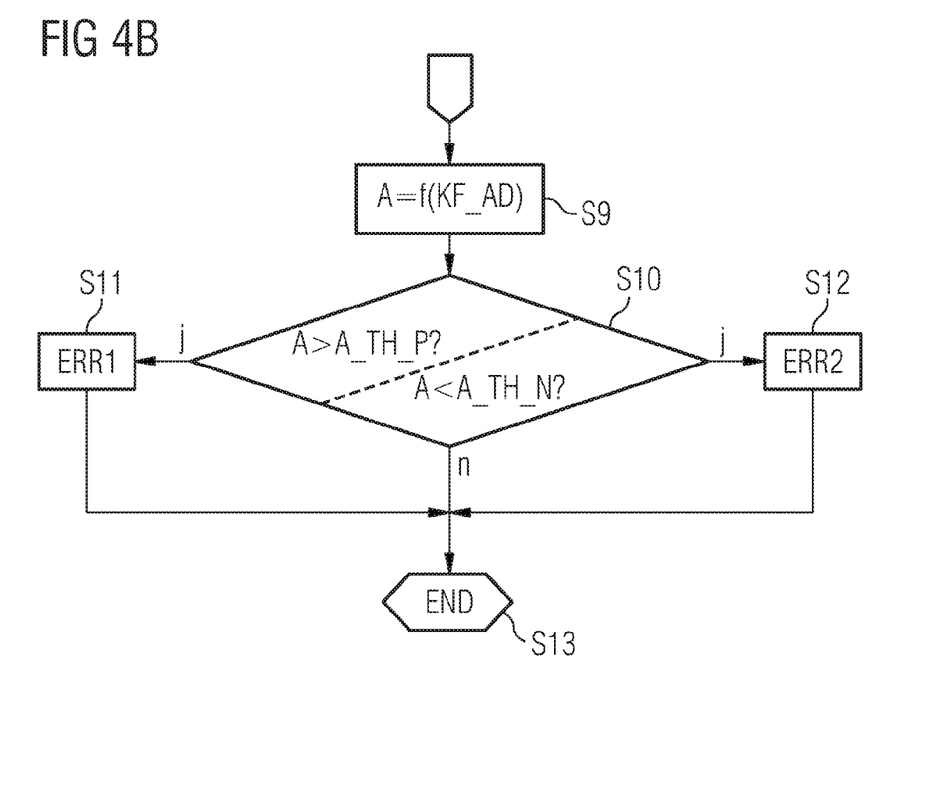

The adaptation device ADAP is embodied for adaptation of the adaptation characteristic map KF_AD as a function of the boost pressure PUT and the adapted basic boost pressure value PUT-WG_OPEN_AD and for output-side provision of a predetermined adaptation value AD. The adaptation characteristic map KF_AD is preferably adapted when the predetermined operating state is available after reaching the predetermined number of operating hours or the predetermined number of adaptation steps respectively. Accordingly the adaptation device ADAP is preferably embodied for adapting the further adaptation characteristic map KF_AD1 before the predetermined number of operating hours or the predetermined number of adaptation steps respectively are reached. The adaptation device ADAP is typically embodied to increase the basic boost pressure adaptation pressure value stored for the current rotational speed N of the internal combustion engine in the adaptation characteristic map KF_AD or the further basic boost pressure adaptation pressure value PUT_WG_OPEN_AD1_ADD stored in the further adaptation characteristic map KF_AD1 by the predetermined adaptation value AD if the boost pressure PUT detected or determined is greater by a predetermined adaptation threshold value AD_TH than the adapted basic boost pressure value PUT_WG_OPEN_AD. Accordingly the adaptation device ADAP is for example embodied for reducing the basic boost pressure adaptation pressure value PUT_WG_OPEN_AD_ADD stored for the current rotational speed N of the internal combustion engine in the adaptation characteristic map KF_AD or the further basic boost pressure adaptation pressure value PUT_WG_OPEN_AD1_ADD stored in the further adaptation characteristic map KF_AD1 by the predetermined adaptation value AD if the detected or determined boost pressure PUT is less than the adapted basic boost pressure value PUT_WG-OPEN_AD by the predetermined adaptation threshold value AD_TH. The error detection device ERR is embodied to detect an error of the intake tract 1 and especially to detect a first error ERR1 and a second error ERR2 as a function of the basic boost pressure adaptation pressure value PUT_WG_OPEN_AD_ADD stored in the adaptation characteristic map KF_AD and especially as a function of a rise in a curve of the basic boost pressure adaptation pressure value PUT_WG_OPEN_AD_ADD stored in the adaptation characteristic map KF_AD. FIG. 3 shows as typical alternatives a first curve C1 and a second curve C2 of learned basic boost pressure adaptation pressure values PUT_WG_OPEN_AD_ADD which could be stored in the adaptation characteristic map KF_AD. The first curve exhibits a monotonously rising gradient and the second curve C2 exhibits a monotonously falling gradient. Preferably a regression line is determined as a function of the basic boost pressure adaptation pressure values PUT_WG_OPEN_AD_ADD. Preferably a gradient of a respective regression line is determined as the gradient A. With respect to the first curve C1, the gradient A thus represents a gradient of a first regression line REG_C1 which in its turn represents the gradient, in this case positive, of the first curve C1. In respect of the second curve C2, the gradient A accordingly represents a gradient of a second regression line REG_C2 which once again represents the gradient, in this case negative, of the second curve C2. The basic boost pressure PUT_WG_OPEN is in general greater than the ambient pressure AMP. If the leak is present in the intake tract 1 downstream of the compressor 42, air thus flows through the leak out of the intake tract 1 into the environment. The basic boost pressure PUT_WG_OPEN only changes a little with the rotational speed N. A pressure obtaining before the leak is substantially the same for all rotational speeds N as a pressure obtaining after the leak. An air mass flow through the leak, disregarding dependencies on an air temperature in the predetermined operating state of the internal combustion engine at basic boost pressure PUT_WG_OPEN, is essentially the same for all rotational speeds N. An air mass flow in the cylinder of the internal combustion engine intended for operation of the internal combustion engine, i.e. desired, rises in the predetermined operating state at basic boost pressure PUT_WG_OPEN strictly monotonously increasing with the rotational speed N of the internal combustion engine. The air mass flow in the cylinder of the internal combustion engine is approximately proportional to the rotational speed N. The leak makes the basic boost pressure PUT_WG_OPEN substantially proportional to a ratio of the air mass flow through the leak to the air mass flow in the cylinder of the internal combustion engine lowered in relation to the error-free intake tract 1. Thus relatively large negative basic boost pressure adaptation pressure values PUT_WG_OPEN_AD_ADD are learned by adaptation for small rotational speeds N and for large rotational speeds comparatively small negative basic boost pressure adaptation pressure values PUT_WG_OPEN_AD_ADD are learned by adaptation, which produces the positive gradient A of the first curve C1 and the associated regression line REG_C1. Thus leakage downstream of the compressor 42 can be concluded from the positive gradient A and such a leakage can for example be detected as the first error ERR1 of the intake tract 1. The contamination of the air filter 38 causes an increase in the drop in pressure across the air filter 38. The drop in pressure across the air filter 38 increases strictly monotonously with the air mass flow through the air filter 38. In the predetermined operating state for the basic boost pressure PUT_WG_OPEN this air mass flow through the air filter 38 increases strictly monotonously with the rotational speed N of the internal combustion engine. This means that relatively small negative basic boost pressure adaptation pressure values PUT_WG_OPEN_AD_ADD are learned by adaptation for small rotational speeds N and relatively large negative basic boost pressure adaptation pressure values PUT_WG_OPEN_AD_ADD are learned by adaptation for large rotational speeds N, which produces the negative gradient A of the second curve C2 and the associated second regression line REG_C2. Thus the contaminated air filter 38 can be deduced from the negative gradient A and such a contamination of the air filter 38 can be detected as the second error ERR2 of the intake tract 1. FIGS. 4A and 4B show a flow diagram of a program for diagnosing the intake tract 1 of the internal combustion engine. The flow diagram especially shows the steps involved in the diagnosis which have been principally explained in relation to FIGS. 2 and 3. The program is preferably stored on a storage medium of the control device 25. The program is preferably started in a step S1 in which variables are initialized if necessary.

In a step S2 the throttle valve position POS_THR and the waste gate position POS_WG are typically determined, in order in a step S3, especially as a function of this step, to check whether the at least one activation condition for carrying out the adaptation of the basic boost pressure PUT_WG_OPEN is present. The throttle valve position POS_THR and the waste gate position POS_WG are especially setpoint values of the respective position. The at least one activation condition includes the predetermined operating state of the internal combustion engine being available in which the basic boost pressure PUT_WG_OPEN prevails, meaning that the throttle valve 5 is controlled such that the throttle valve 5 exhibits at least one maximum predetermined degree of opening, i.e. has the maximum possible throttle opening, and that the waste gate 50 is controlled such that the power of the exhaust gas turbocharger corresponds to a predetermined minimum power, i.e. the whole of the exhaust gas is substantially routed past the turbine 48. Preferably there is provision for the at least one activation condition to further include the predetermined operating state being available for predetermined minimum time. The predetermined minimum time lies for example in the order or magnitude of a second and typically amounts to around two seconds. The predetermined minimum period of time can however also be predetermined differently.

If the at least one activation condition is not fulfilled in step S3, the program is preferably continued in step S2. However, if the at least one activation condition is fulfilled, the predetermined operating state of the internal combustion engine thus obtains, in which the basic boost pressure PUT_WG_OPEN prevails downstream of the compressor 42, then in a step S4 the boost pressure PUT and the rotational speed N of the internal combustion engine are detected or determined. If necessary the ambient pressure AMP is also detected or determined.

In a step S5, the adapted basic boost pressure value PUT_WG_OPEN_AD is determined as a function of the rotational speed N and where necessary as a function of the ambient pressure AMP. Preferably the adapted basic boost pressure value PUT_WG_OPEN_AD is determined as the sum of the reference basic boost pressure value PUT_WG_OPEN_REF, the basic boost pressure adaptation pressure value PUT_WG_OPEN_AD_ADD and where necessary the further basic boost pressure adaptation pressure value PUT_WG_OPEN_AD1_ADD. In a step S6 a check is made, for example by the adaptation device ADAP, as to whether the detected or determined boost pressure PUT is greater by at least the predetermined adaptation threshold value AD_TH than the adapted basic boost pressure value PUT_WG_OPEN_AD determined. If this condition is fulfilled, then in a step S7 the predetermined adaptation value AD is determined and is predetermined for the adaptation and in a step S8 the basic boost pressure adaptation pressure value PUT_WG_OPEN_AD_ADD of the adaptation characteristic map KF_AD belonging to the rotational speed N and if necessary the ambient pressure AMP is adapted by the predetermined adaptation value AD, i.e. is increased by said value. Accordingly a check is made in step S6 as to whether the detected or determined boost pressure PUT is smaller by at least the predetermined adaptation threshold value AD_TH than the determined adapted basic boost pressure value PUT_WG_OPEN_AD. If this condition is fulfilled, then in step S7 the predetermined adaptation value AD is determined and is predetermined for the adaptation and in step S8 the basic boost pressure adaptation pressure value PUT_WG_OPEN_AD_ADD of the adaptation characteristic map KF_AD belonging to the rotational speed N and if necessary the ambient pressure AMP is reduced by the predetermined adaptation value AD, i.e. it is adapted. However if the conditions in step S6 are not fulfilled then the program is preferably continued in step S2. The adaptation is not then carried out.

After step S8, but not absolutely directly after this step, a step S9 is preferably carried out. In step S9 the gradient A is determined as a function of the basic boost pressure adaptation pressure values PUT_WG_OPEN_AD_ADD stored in the adaptation characteristic map KF_AD. In particular the regression line is determined as a function of the stored basic boost pressure adaptation pressure values PUT_WG_OPEN_AD_ADD and the gradient A is determined as a gradient of these regression lines. In a step S10 a check is made as to whether the gradient A is greater than a predetermined positive gradient threshold value A_TH_P. If this condition is fulfilled, then in a step S11 the first error ERR1 is detected. The first error ERR1 especially represents the leakage of the intake tract 1 downstream of the compressor 42. Accordingly a check is made in step S10 as to whether the gradient A is less than a predetermined negative gradient threshold value A_TH_N. If this condition is fulfilled, then in a step S12 the second error ERR2 is detected. The second error ERR2 especially represents the contaminated air filter 38. The program ends after step S11 or after step S12 respectively in a step S13. The program likewise ends in step S13 if the conditions are not fulfilled in step S10. Preferably the program is then continued in step S2. The steps S9 to S12 are especially executed by the error detection device ERR. The presence of the first or the second error ERR1, ERR2 is preferably logged in an error memory of the control device 25 and/or displayed as an error message to the user of the internal combustion engine. The program is correspondingly executed for adapting the further basic boost pressure adaptation pressure values PUT_WG_OPEN_AD1_ADD of the further adaptation characteristic map KF_AD1.

The invention is not restricted to the specified exemplary embodiments. For example another positioning element for adjusting the waste gate 50 can be provided as an alternative to the valve positioning member. The relative deviations as a result of the individual difference of the internal combustion engine in relation to the reference internal combustion engine can for example also already be taken into account in the reference characteristic map KF_REF instead of in the further adaptation characteristic map KF_AD1 or learned in the adaptation characteristic map KF_AD. The further adaptation characteristic map KF_AD1 is then dispensable. The internal combustion engine can also be embodied differently. In particular for example a boost air cooler can be provided in the intake tract 1, for example upstream or downstream of the throttle valve 5. In addition the program can be implemented in a further program and/or divided into subroutines.

What is claimed is:

1. A method for diagnosing an intake tract of an internal combustion engine, which comprises a compressor, the method comprising:
   checking as to whether at least one predetermined activation condition is fulfilled,
   detecting or determining a boost pressure downstream of the compressor,
   adapting an adaptation characteristic curve or an adaptation characteristic map as a function of a rotational speed, of the internal combustion engine and the boost pressure if the at least one activation condition is fulfilled,
   determining a gradient which is representative of the gradient of the adaptation characteristic curve or the adaptation characteristic map, and
   depending on the gradient determined, detecting an error in the intake tract of the internal combustion engine.

2. The method according to claim 1, wherein the at least one activation condition includes the boost pressure being detected or determined for a predetermined operating state of the internal combustion engine, in which, for an error-free internal combustion engine, the detected or determined boost pressure corresponds to a basic boost pressure.

3. The method according to claim 2, wherein the predetermined operating state in which, for an error-free internal combustion engine, the detected or determined boost pressure corresponds to the basic boost pressure includes a throttle valve being controlled so that the throttle valve has at least one predetermined maximum degree of opening, and a waste gate of an exhaust gas turbocharger is controlled such that a power of the exhaust gas turbocharger corresponds to a predetermined minimum power.

4. The method according to claim 2, wherein the at least one activation condition includes the predetermined operating state obtaining for a predetermined minimum duration.

5. The method according to claim 1, wherein, before a predetermined number of operating hours is reached or a predetermined number of adaptation steps after the internal combustion engine is first put into service, instead of the adaptation characteristic curve or the adaptation characteristic map a further adaptation characteristic curve or a further adaptation characteristic map is adapted if the at least one activation condition is fulfilled, and after the predetermined number of operating hours or number of adaptation steps has been reached, the adaptation characteristic curve or the adaptation characteristic map is adapted as a function of the further adaptation characteristic curve or the further adaptation characteristic map.

6. The method according to claim 1, wherein the adaptation characteristic curve or the adaptation characteristic map or if necessary the further adaptation characteristic curve for the further adaptation characteristic map are adapted if the boost pressure detected or determined for the rotational speed is greater by a predetermined upper adaptation threshold value than an adapted basic boost pressure value assigned to the rotational speed, which depends on the adaptation characteristic curve or the adaptation characteristic map and if necessary on the further adaptation characteristic curve for the further adaptation characteristic map, or is less by a predetermined lower adaptation threshold value than the adapted basic boost pressure value assigned to the rotational speed.

7. The method according to claim 1, wherein the adaptation characteristic curve or the adaptation characteristic map are adapted as a function of the ambient pressure if the at least one activation condition is fulfilled.

8. The method according to claim 1, wherein the gradient is determined as a gradient of a regression line and the regression line is determined as a function of the basic boost pressure adaptation pressure values stored in the adaptation characteristic curve or the adaptation characteristic map plotted against the rotational speed.

9. The method according to claim 1, wherein leakage downstream of the compressor is detected as the error of the intake tract if the gradient is greater than a predetermined positive gradient threshold value.

10. The method according to claim 1, wherein a contaminated air filter is detected as the error of the intake tract if the gradient is less than a predetermined negative gradient threshold value.

11. A device for diagnosing an intake tract of an internal combustion engine, wherein the internal combustion engine comprises a compressor which is operable
to check whether at least one predetermined activation condition is fulfilled,
to detect or determine a boost pressure downstream of the compressor,
to adapt an adaptation characteristic curve or an adaptation characteristic map as a function of a rotational speed of the internal combustion engine and the boost pressure if the at least one activation condition is fulfilled,
to determine a gradient which is representative for a gradient of the adaptation characteristic curve or the adaptation characteristic map, and
to detect an error of the intake tract of the internal combustion engine as a function of the gradient determined.

12. The device according to claim 11, wherein the at least one activation condition includes the boost pressure being detected or determined for a predetermined operating state of the internal combustion engine, in which, for an error-free internal combustion engine, the detected or determined boost pressure corresponds to a basic boost pressure.

13. The device according to claim 12, wherein the predetermined operating state in which, for an error-free internal combustion engine, the detected or determined boost pressure corresponds to the basic boost pressure includes a throttle valve being controlled so that the throttle valve has at least one predetermined maximum degree of opening, and a waste gate of an exhaust gas turbocharger is controlled such that a power of the exhaust gas turbocharger corresponds to a predetermined minimum power.

14. The device according to claim 12, wherein the at least one activation condition includes the predetermined operating state obtaining for a predetermined minimum duration.

15. The device according to claim 11, wherein, before a predetermined number of operating hours is reached or a predetermined number of adaptation steps after the internal combustion engine is first put into service, instead of the adaptation characteristic curve or the adaptation characteristic map a further adaptation characteristic curve or a further adaptation characteristic map is adapted if the at least one activation condition is fulfilled, and after the predetermined number of operating hours or number of adaptation steps has been reached, the adaptation characteristic curve or the adaptation characteristic map is adapted as a function of the further adaptation characteristic curve or the further adaptation characteristic map.

16. The device according to claim 11, wherein the adaptation characteristic curve or the adaptation characteristic map or if necessary the further adaptation characteristic curve for the further adaptation characteristic map are adapted if the boost pressure detected or determined for the rotational speed is greater by a predetermined upper adaptation threshold value than an adapted basic boost pressure value assigned to the rotational speed, which depends on the adaptation characteristic curve or the adaptation characteristic map and if necessary on the further adaptation characteristic curve for the further adaptation characteristic map, or is less by a predetermined lower adaptation threshold value than the adapted basic boost pressure value assigned to the rotational speed.

17. The device according to claim 11, wherein the adaptation characteristic curve or the adaptation characteristic map are adapted as a function of the ambient pressure if the at least one activation condition is fulfilled.

18. The device according to claim 11, wherein the gradient is determined as a gradient of a regression line and the regression line is determined as a function of the basic boost pressure adaptation pressure values stored in the adaptation characteristic curve or the adaptation characteristic map plotted against the rotational speed.

19. The device according to claim 11, wherein a leakage downstream of the compressor is detected as the error of the intake tract if the gradient is greater than a predetermined positive gradient threshold value.

20. The device according to claim 11, wherein a contaminated air filter is detected as the error of the intake tract if the gradient is less than a predetermined negative gradient threshold value.

* * * * *